Figure 7:
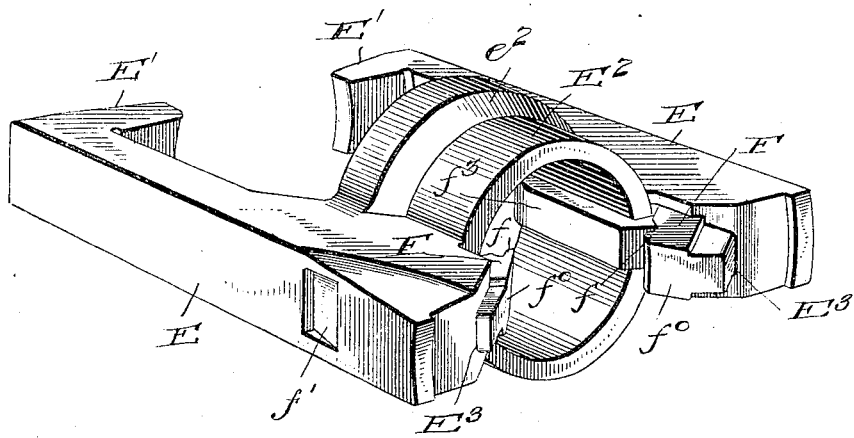

No. 804,699. PATENTED NOV. 14, 1905.
L. V. BENÉT & H. A. MERCIÉ.
CARTRIDGE CASE EXTRACTOR.
APPLICATION FILED DEC. 12, 1904.
6 SHEETS—SHEET 1.
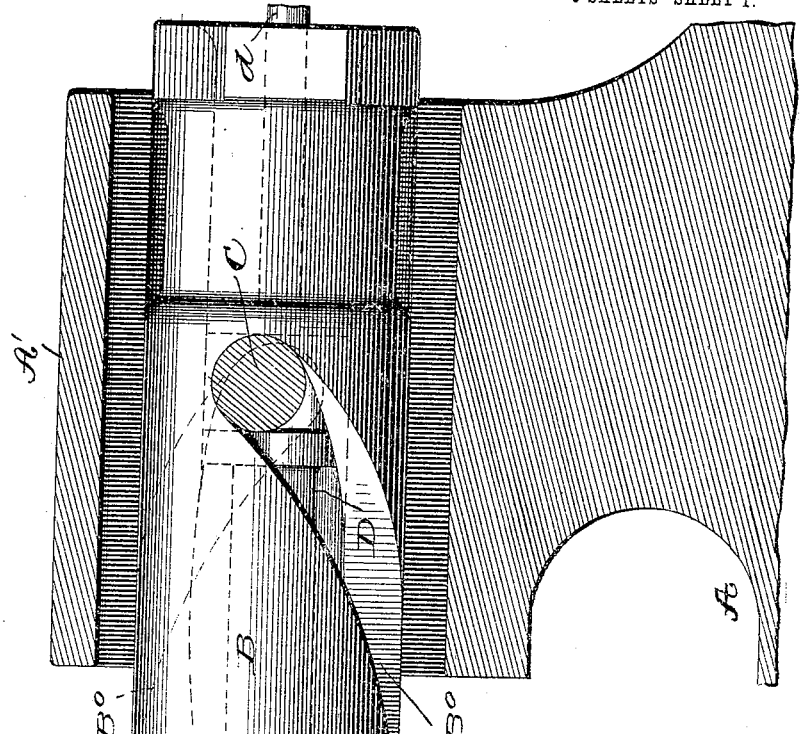
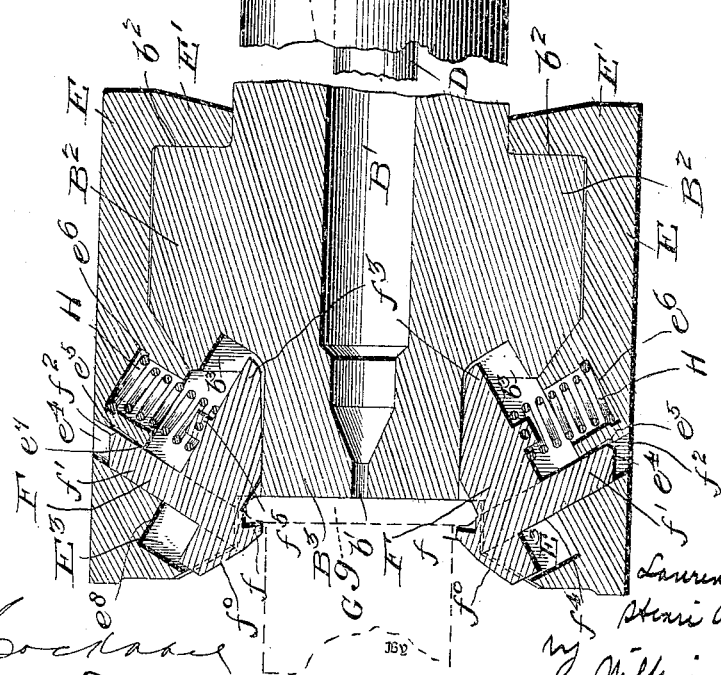
Fig. 1.

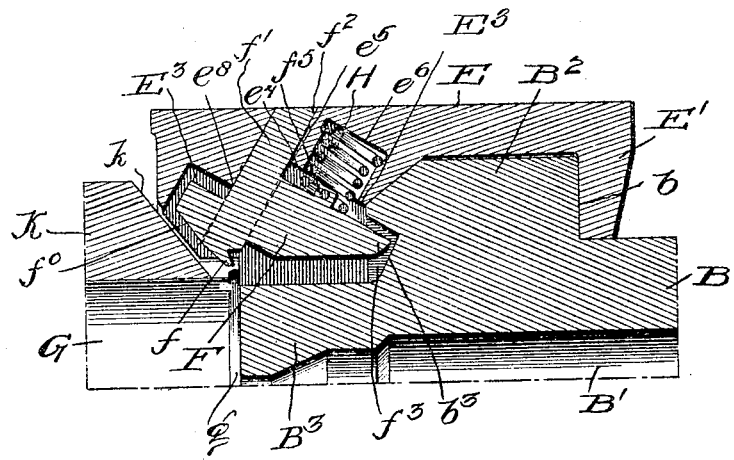
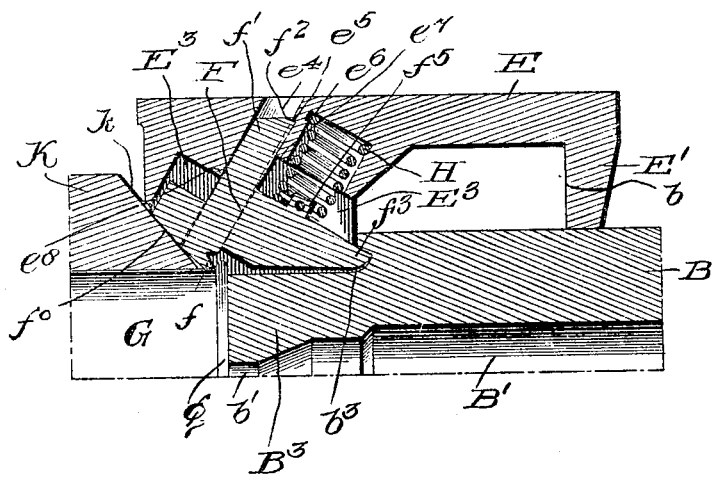

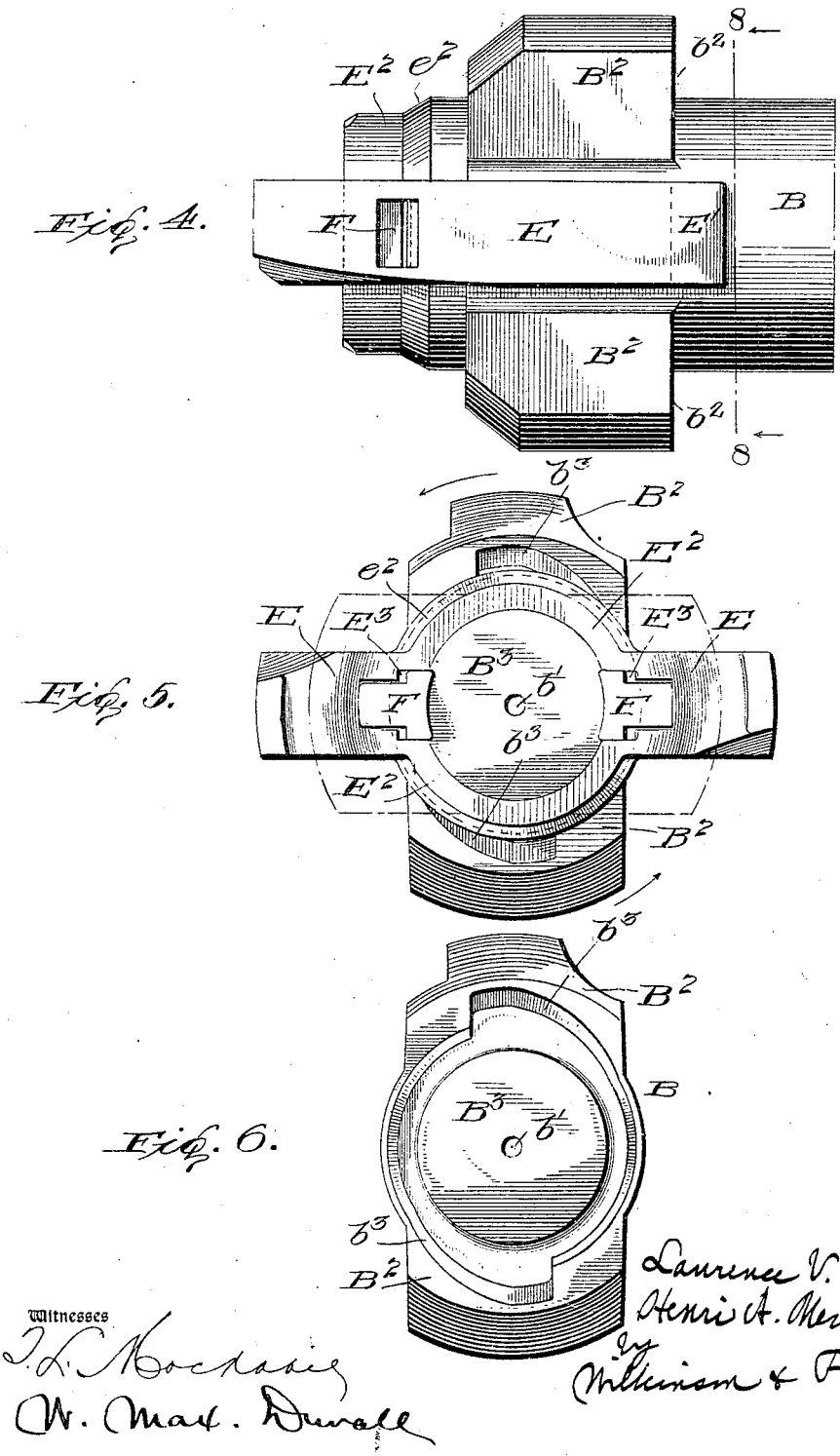

No. 804,699. PATENTED NOV. 14, 1905.
L. V. BENÉT & H. A. MERCIÉ.
CARTRIDGE CASE EXTRACTOR.
APPLICATION FILED DEC. 12, 1904.

6 SHEETS—SHEET 5.

Witnesses
Inventors
Laurence V. Benét,
Henri A. Mercié,
By Wilkinson & Fisher
Attorneys.

No. 804,699. PATENTED NOV. 14, 1905.
L. V. BENÉT & H. A. MERCIÉ.
CARTRIDGE CASE EXTRACTOR.
APPLICATION FILED DEC. 12, 1904.

6 SHEETS—SHEET 6.

UNITED STATES PATENT OFFICE.

LAURENCE V. BENÉT AND HENRI A. MERCIÉ, OF PARIS, FRANCE.

CARTRIDGE-CASE EXTRACTOR.

No. 804,699.  Specification of Letters Patent.  Patented Nov. 14, 1905.

Application filed December 12, 1904. Serial No. 236,633.

*To all whom it may concern:*

Be it known that we, LAURENCE V. BENÉT, a citizen of the United States, and HENRI A. MERCIÉ, a citizen of France, residing at Paris, in the Republic of France, have invented certain new and useful Improvements in Cartridge-Case Extractors; and we do hereby declare the following to be a full, clear, and exact description of the invention, such as will enable others skilled in the art to which it appertains to make and use the same.

Our present invention relates to improvements in cartridge-case extractors, and more especially to extractors of the type which move longitudinally with the breech-block parallel to the axis of the gun, but are held against turning laterally while the breech-block is rotated from the locked to the unlocked position, or vice versa. The invention can also be applied to straight-pull breech-blocks by suppressing the locking-arms on the breech-block. Extractors of this class are more especially adapted for use with guns of small caliber and especially where the action is rapid, and we have shown and described it as embodied in a gun of the general character of that described and shown in the patent to Benét and Mercié, No. 696,306, granted March 25, 1902, and entitled "Automatic gun."

In the drawings we have shown only so much of the gun and of the operating parts as is necessary to illustrate the action of the extractor, as the extractor mechanism only constitutes the subject-matter of our present invention.

Reference is had to the accompanying drawings, in which the same parts are indicated by the same letters throughout the several views.

Figure 8:
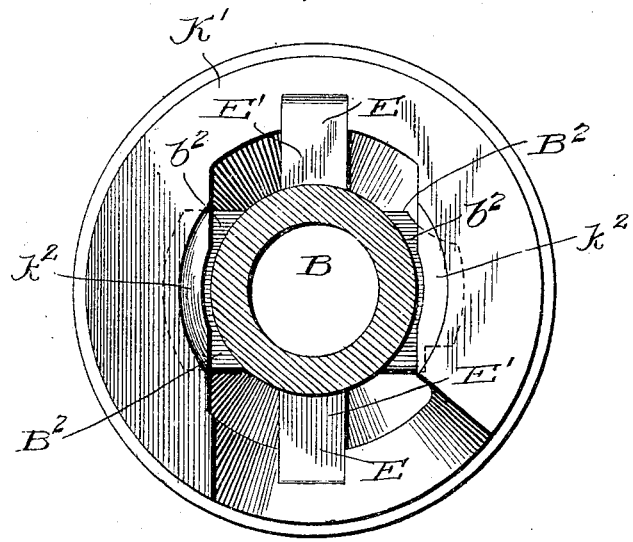
Figure 9:
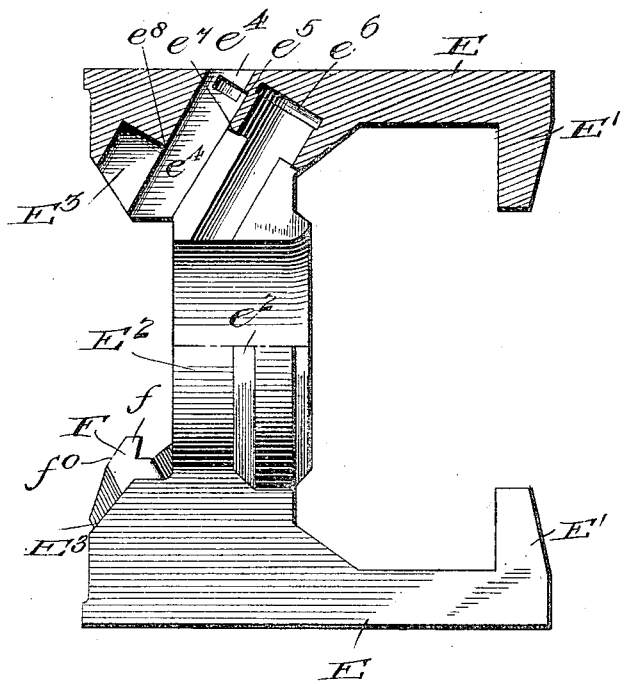
Figure 10:
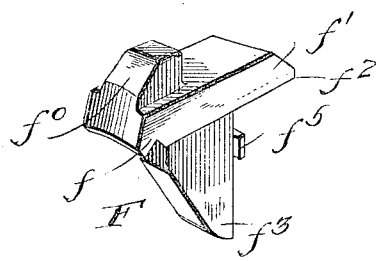
Figure 11:
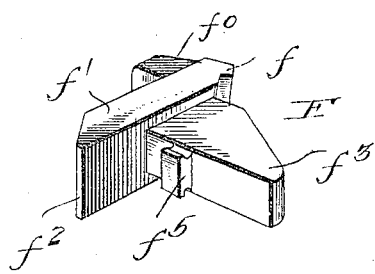
Figure 12:
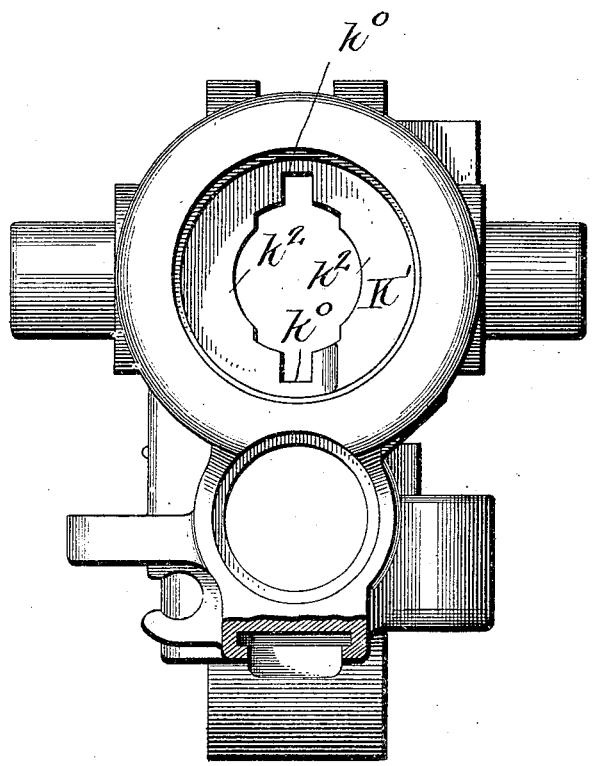

Figure 1 shows the breech-block, partly in elevation and partly in section, with the motor-piston and the extractor mechanism in section and represents the position of the extractors when the breech-block is unlocked. Fig. 2 is a vertical half-section through the axis of the extractor mechanism, showing a portion of the gun, of the cartridge, and of the breech-block, and shows the position of one of the extractors just as the breech-block is being rotated for closing. Fig. 3 is a similar section and shows the position of one of the pair of extractors when the breech is closed and the extractors are engaged. The operation of the two extractors being identical, only one extractor is shown in Figs. 2 and 3. Fig. 4 is a plan view of the front end of the breech-block with the extractor mechanism mounted thereon. Fig. 5 is a front elevation of the breech-block and extractor mechanism as seen from the left of Fig. 4. Fig. 6 is a similar view of the breech-block with the extractor holders or supports and extractors omitted. Fig. 7 is a perspective view of the extractor holder with the extractors mounted therein as detached from the breech-block. Fig. 8 shows a section, on a reduced scale, of the breech-block on the line 8 8 of Fig. 4 and looking in the direction of the arrows and also shows the engagement of the extractor-holder and of the tenons of the breech-block with the housing at the breech of the gun. Fig. 9 shows a sectional elevation of the extractor holder or support, the lower half being shown in elevation with one extractor contained therein and the upper half being shown in section with the extractor removed; and Figs. 10 and 11 are details showing the extractor in perspective. Fig. 12 is a rear view of the casing at the rear of the gun with the mechanism removed and shows the longitudinal grooves for the extractor-holders.

A represents a part of the motor-piston, which may be gas-operated, as in the Benét and Mercié patent aforesaid, and is provided with a sleeve A', in which is mounted the breech-block B, which breech-block is provided with cam-grooves B⁰, into which projects a pin C, extending across the sleeve A', and this pin also serves to hold the firing-pin D, which is mounted in the cavity D' in the breech-block and projects rearward therein, as shown at *d*. The point of the firing-pin (not shown) passes through the hole *b'* in the front face of the breech-block. By means of the engagement of this pin C with the cam-grooves B⁰ after the gun has been fired the breech-block is caused to rotate from the locked to the unlocked position until the pin C reaches the position shown in Fig. 1. Then the breech-block is carried rearward the full length of the recoil of the motor-piston, and in returning to the initial position the breech-block is arrested by the breech or any other part of the gun-body, and the pin C, coöperating with the cam-grooves B⁰, causes the breech-block to rotate back to the locked position, as shown in Fig. 8. This action is described in detail in the Benét and Mercié patent aforesaid and constitutes no particular part of the present invention, and it will be obvious that a straight-pull breech-block which does not rotate may be used with extractors of the character hereinafter described. The front end of the breech-block carries tenons $B^2$, which are shouldered to the rear, as at $b^2$, to engage shoulders $k^2$ on the housing $K'$ at the breech of the gun, as shown in Fig. 8, and as fully described in the Benét and Mercié patent aforesaid, and these tenons are provided on their forward faces with cam-grooves $b^3$, (shown most clearly in Figs. 5 and 6,) which cam-grooves extend along the outer edge of the forward portion of the breech-block.

The extractors are supported in two blocks E, connected together by or preferably made integral with a ring $E^2$, which ring is mounted on the cylindrical portion $B^3$ at the forward end of the breech-block. These blocks E are provided with lugs $E'$, which engage the shoulders $b^2$ of the tenons $B^2$, and the strain on the extractor in pulling out the empty cartridge-case is transferred to these lugs $E'$. The extractors F, two in number, are oppositely disposed, so as to draw the cartridge-case straight to the rear without binding against either side of the powder-chamber. The extractor-supports E slide longitudinally in grooves $k^0$ in the casing at the rear of the breech-block chamber, and thus the extractor-holders and the extractors are held against turning while the breech-block is rotated through an angle for locking and unlocking. When the extractor-support and breech-block are in the position shown in Fig. 4 and as also shown in full lines in Fig. 5, the ring $E^2$ with the blocks E may be readily drawn forward and removed from the breech-block, as in disassembling the parts.

The extractors are mounted to rock slightly and to slide outwardly and inwardly in a recess $E^3$ in the extractor-holders E and are each provided with a claw $f$, having an inclined face $f^0$ adjacent thereto, with a shank $f'$, traveling in an inclined groove $e^4$ in the extractor-support, and having a nose or lug $f^2$, adapted to engage a shoulder $e^5$ in the extractor-holder, as will be hereinafter described. Each extractor is also provided with a lever-arm $f^3$, adapted to engage in the cam-groove $b^3$ and with the stud $f^5$, to which the spring H is attached. This spring is mounted in a recess in the extractor-holder, which recess is preferably enlarged somewhat in its inner end, as at $e^6$, to receive the end of the spring H, and thus this spring holds the extractor in its holder when the said holder is removed from the breech-block.

G represents the cartridge-case, (see Figs. 1, 2, and 3,) having the rim $g$, and K represents a portion of the breech of the gun, having the inclined face $k$ registering with the extractor mechanism.

The operation of the device is as follows: Suppose the parts to be in the position shown in Fig. 1 and the motor-piston to be in its rearward position about to return on counter-recoil. The parts will remain in the position shown in Fig. 1 until the forward motion of the breech-block is arrested by striking some part of the breech of the gun. Just before this takes place the inclined face $f^0$ of the extractor will strike the rim $g$ of the cartridge-case, rocking the claw of the extractor slightly rearward about the point $e^7$. This will cause the stop $f^2$ on the shank $f'$ to swing out of engagement with the notch $e^5$, and the wedging effect of the rim of the cartridge-case on the face $f^0$ of the extractor will wedge the extractor upward until it assumes the position shown in Fig. 2. This upward motion of the extractor will compress the spring H. As soon as the claw of the extractor has passed clear of the rim of the cartridge-case the spring H will snap the extractor downward again until the inclined face $f^0$ strikes the inclined face $k$ of the gun, at which time the claw of the extractor will be in front of the rim of the cartridge-rim. During part of or all of the brief interval required to move the extractor up and down, as just indicated, the breech-block is going through the process of being automatically locked, which is accomplished by turning the breech-block through ninety degrees, or to the position indicated in Fig. 8. This rotation of the breech-block causes the lever-arm $f^3$ of the extractor to ride down the cam-groove $b^3$, rocking the extractor forward and causing the lug $f^2$ to engage under the notch $e^5$, forcing the parts to assume the position shown in Fig. 3. During the angular movement of unlocking the breech-block or turning it to the position shown in dotted lines in Fig. 5 the springs H hold the extractors in the position shown in Fig. 3, and as soon as the breech-block starts rearward, under the action of the motor-piston, the claws $f$ will bring up against the rim $g$ of the cartridge-case, tending to rock the extractors forward about the point $e^8$; but this rocking motion is limited by the shank $f'$ and the notch $e^5$. Owing to the inclination of the grooves in which the shank $f'$ is mounted, a straight pull backward on the claw of the extractor will tend to wedge the extractor inward toward the axis of the bore, causing these claws to bite harder into the cartridge-case, so that the greater the strain the more firmly are the extractors held. After the cartridge-case has been dislodged from its seat there will be very little strain on the extractors, and the cartridge-case will be held with sufficient rigidity under the action of the springs H, which will tend to keep the claws in engagement until the cartridge-case reaches the path of the ejector, (not shown,) by means of which it is knocked out of engagement with the extractors and is ejected at right angles to the axis of the breech-block, as fully described in the Benét and Mercié patent aforesaid. The ejector mechanism, not being part of our present invention, will not be described herein.

It will be obvious that various modifications may be made in the herein-described apparatus which could be used without departing from the spirit of the invention.

Having thus described our invention, what we claim, and desire to secure by Letters Patent of the United States, is—

1. In a breech-loading gun, the combination with a breech-block adapted to rotate for locking and unlocking and to move longitudinally in reverse directions, of an extractor-holder mounted on said breech-block and moving longitudinally therewith and provided with oppositely-disposed recesses and inclined grooves, of extractors mounted in said recesses and having shanks engaging in said inclined grooves, and means secured to or integral with the gun-body for holding the extractor-holder from turning relative to the breech-block substantially as described.

2. In a breech-loading gun, the combination with a breech-block adapted to rotate for locking and unlocking and to move longitudinally in reverse directions, of an extractor-holder mounted on said breech-block and moving longitudinally therewith and provided with oppositely-disposed recesses and inclined grooves, of extractors mounted in said recesses and having shanks engaging in said inclined grooves, with springs interposed between the backs of said extractors and said extractor-holder and pressing said extractors inward toward the axis of the breech-block, and means secured to or integral with the gun-body for holding the extractor-holder from turning relative to the breech-block substantially as described.

3. In a breech-loading gun, the combination with a breech-block adapted to rotate for locking and unlocking and to move longitudinally in reverse directions, of an extractor-holder mounted on said breech-block and moving longitudinally therewith and provided with oppositely-disposed recesses and inclined grooves, of extractors mounted in said recesses and having shanks engaging in said inclined grooves, with springs connected to the backs of the extractors and also to the extractor-holder and tending to retain said extractors in said holder and also to press said extractors toward the axis of the breech-block, and means secured to or integral with the gun-body for holding the extractor-holder from turning relative to the breech-block substantially as described.

4. In a breech-loading gun, the combination with the breech-block adapted to rotate through an angle to unlock and then to be moved longitudinally in reverse directions, of an extractor-holder detachably connected to said breech-block and moving longitudinally therewith, means secured to or integral with the gun-body for holding the extractor-holder from turning with said breech-block, with oppositely-disposed recesses in said extractor-holder, and extractors mounted in said recesses, with springs also mounted in said recesses engaging the backs of said extractors and pressing said extractors toward the axis of the breech-block, substantially as described.

5. In a breech-loading gun, the combination with the breech-block adapted to rotate through an angle to unlock and then to be moved longitudinally in reverse directions, of an extractor-holder detachably connected to said breech-block and moving longitudinally therewith, means secured to or integral with the gun-body for holding the extractor-holder from turning with said breech-block and oppositely-disposed recesses in said extractor-holder, and extractors mounted in said recesses, with springs also mounted in said recesses and secured to the backs of the extractors and to the extractor-holder, respectively, and pressing said extractors inward toward the axis of the breech-block, substantially as described.

6. In a breech-loading gun, the combination with a breech-block adapted to rotate for locking and unlocking and to move longitudinally in reverse directions, of an extractor-holder mounted on said breech-block and moving longitudinally therewith, means secured to or integral with the gun-body for holding the extractor-holder from turning therewith and provided with oppositely-disposed recesses and inclined grooves, and shoulders in rear of said inclined grooves, and extractors mounted in said recesses and having shanks sliding in said inclined grooves with lugs engaging said shoulders, substantially as described.

7. In a breech-loading gun, the combination with a breech-block adapted to rotate for locking and unlocking and to move longitudinally in reverse directions, of an extractor-holder mounted on said breech-block and moving longitudinally therewith, means secured to or integral with the gun-body for holding the extractor-holder from turning therewith and provided with oppositely-disposed recesses and inclined grooves, and shoulders in rear of said inclined grooves, and extractors mounted in said recesses and having shanks sliding in said inclined grooves with lugs engaging said shoulders, with springs interposed between the backs of said extractors, and said extractor-holder and pressing said extractors inward toward the axis of the breech-block, substantially as described.

8. In a breech-loading gun, the combination with a breech-block adapted to rotate for locking and unlocking and to move longitudinally in reverse directions, of an extractor-holder mounted on said breech-block and moving longitudinally therewith, means secured to or integral with the gun-body for holding the extractor-holder from turning therewith and provided with oppositely-disposed recesses and inclined grooves, and shoulders in rear of said inclined grooves, and extractors mounted in said recesses and having shanks sliding in said inclined grooves with lugs engaging said shoulders, with springs connected to the backs of the extractors and also to the extractor-holder and tending to retain said extractors in said holder and also to press said extractors toward the axis of the breech-block, substantially as described.

9. In a breech-loading gun, the combination with a breech-block provided with tenons and adapted to rotate through an angle to unlock and then to be moved longitudinally in reverse directions, of an annular extractor-holder recessed interiorly to register with said tenons and mounted on said breech-block and moving longitudinally therewith, means secured to or integral with the gun-body for holding the extractor-holder from turning with said breech-block, and oppositely-disposed extractors mounted in said extractor-holder in front of said tenons, substantially as described.

10. In a breech-loading gun, the combination with a breech-block provided with tenons and adapted to rotate through an angle to unlock and then to be moved longitudinally in reverse directions, of an annular extractor-holder recessed interiorly to register with said tenons and mounted on said breech-block and moving longitudinally therewith, means secured to or integral with the gun-body for holding the extractor-holder from turning with said block, oppositely-disposed extractors mounted in said extractor-holder in front of said tenons, and springs engaging the backs of said extractors and pressing said extractors toward the axis of the breech-block, substantially as described.

11. In a breech-loading gun, the combination with a breech-block provided with tenons and adapted to rotate through an angle to unlock and then to be moved longitudinally in reverse directions, of an annular extractor-holder recessed interiorly to register with said tenons and mounted on said breech-block and moving longitudinally therewith, means secured to or integral with the gun-body for holding the extractor-holder from turning with said block, oppositely-disposed extractors mounted in said extractor-holder in front of said tenons, and springs secured to the backs of the extractors and to the extractor-holder respectively, and pressing said extractors inward toward the axis of the breech-block, substantially as described.

12. In a breech-loading gun, the combination with a breech-block provided with tenons and adapted to rotate for locking and unlocking and to move longitudinally in reverse directions, of an extractor-holder recessed to register with said tenons and mounted on said breech-block and moving longitudinally therewith, means secured to or integral with the gun-body for holding the extractor-holder from turning therewith and provided with oppositely-disposed recesses and inclined grooves in front of said tenons, of extractors mounted in said recesses, and having shanks engaging in said inclined grooves, substantially as described.

13. In a breech-loading gun, the combination with a breech-block provided with tenons and adapted to rotate for locking and unlocking and to move longitudinally in reverse directions, of an extractor-holder recessed to register with said tenons and mounted on said breech-block and moving longitudinally therewith, means secured to or integral with the gun-body for holding the extractor-holder from turning therewith and provided with oppositely-disposed recesses and inclined grooves in front of said tenons, of extractors mounted in said recesses and having shanks engaging in said inclined grooves, with springs interposed between the backs of said extractors and said extractor-holder and pressing said extractors inward toward the axis of the breech-block, substantially as described.

14. In a breech-loading gun, the combination with a breech-block provided with tenons and adapted to rotate for locking and unlocking and to move longitudinally in reverse directions, of an extractor-holder mounted on said breech-block, recessed to register with said tenons and moving longitudinally therewith, the said extractor-holder being provided with oppositely-disposed recesses and inclined grooves in front of said tenons, of extractors mounted in said recesses and having shanks engaging in said inclined grooves, with springs connected to the backs of the extractors and also to the extractor-holder and tending to retain said extractors in said holder and also to press said extractors toward the axis of the breech-block, and means secured to or integral with the gun-body for holding the extractor-holder from turning relative to the breech-block, substantially as described.

15. In a breech-loading gun, the combination with a breech-block provided with tenons and adapted to rotate through an angle to unlock and then to be moved longitudinally in reverse directions, of an extractor-holder recessed to register with said tenons and detachably connected to said breech-block and moving longitudinally therewith, means secured to or integral with the gun-body for holding the extractor-holder from turning with said breech-block, the said extractor-holder being also provided with oppositely-disposed recesses in front of said tenons, and extractors mounted both to rock and to slide in said recesses, substantially as described.

16. In a breech-loading gun, the combination with a breech-block adapted to rotate through an angle to unlock and then to be moved longitudinally in reverse directions, of an extractor-holder connected to said breech-block and moving longitudinally therewith, means secured to or integral with the gun-body for holding the extractor-holder from turning with said breech-block, with oppositely-disposed recesses in said extractor-holders, extractors mounted both to rock about a pivot and to slide outwardly in said recesses, and springs also mounted in said recesses engaging the backs of said extractors and pressing said extractors toward the axis of the breech-block, substantially as described.

17. In a breech-loading gun, the combination with the breech-block adapted to rotate through an angle to unlock and then to be moved longitudinally in reverse directions, of an extractor-holder connected to said breech-block and moving longitudinally therewith, means secured to or integral with the gun-body for holding the extractor-holder from turning with said breech-block, with oppositely-disposed recesses in said extractor-holder, and extractors mounted both to rock slightly in and to slide outwardly in said recesses, with springs also mounted in said recesses and secured to the backs of the extractors and to the extractor-holder respectively, and pressing said extractors inward toward the axis of the breech-block, substantially as described.

18. In a breech-loading gun, the combination with a breech-block adapted to rotate for locking and unlocking and to move longitudinally in reverse directions, of an extractor-holder mounted on said breech-block and moving longitudinally therewith, means secured to or integral with the gun-body for holding the extractor-holder from turning therewith and provided with oppositely-disposed recesses and inclined radial grooves, and shoulders in the rear of said inclined grooves, and extractors mounted in said recesses and having claws with inclined front faces adapted to strike the rim of the cartridge-case, and shanks sliding in said inclined grooves with lugs engaging said shoulders, substantially as described.

19. In a breech-loading gun, the combination with a breech-block adapted to rotate for locking and unlocking and to move longitudinally in reverse directions, of an extractor-holder mounted on said breech-block and moving longitudinally therewith, means secured to or integral with the gun-body for holding the extractor-holder from turning therewith and provided with oppositely-disposed recesses and inclined grooves and shoulders in the rear of said inclined grooves, extractors mounted in said recesses and having claws with inclined front faces adapted to strike the rim of the cartridge-case, and shanks sliding in said inclined grooves with lugs engaging said shoulders, and springs interposed between the backs of said extractors and said extractor-holder and pressing said extractors inward toward the axis of the breech-block, substantially as described.

20. In a breech-loading gun, the combination with a breech-block adapted to rotate for locking and unlocking and to move longitudinally in reverse directions, of an extractor-holder mounted on said breech-block and moving longitudinally therewith, means secured to or integral with the gun-body for holding the extractor-holder from turning therewith and provided with oppositely-disposed recesses and inclined grooves and with shoulders in the rear of said inclined grooves, and extractors mounted in said recesses and having claws with inclined front faces adapted to strike the rim of the cartridge-case, and shanks sliding in said inclined grooves with lugs engaging said shoulders, with springs connected to the backs of the extractors and also to the extractor-holder and tending to retain said extractors in said holder and also to press said extractors toward the axis of the breech-block, substantially as described.

21. In a breech-loading gun, the combination with a breech-block adapted to rotate through an angle to unlock and then to be moved longitudinally in reverse directions and provided with a vertical face near its head with cam-grooves cut in said face, of an extractor-holder detachably connected to said breech-block and moving longitudinally therewith, means secured to or integral with the gun-body for holding the extractor-holder from turning with said breech-block, with oppositely-disposed recesses in said extractor-holder, and extractors mounted to rock in said recesses and provided with lever-arms engaging in said cam-grooves, substantially as described.

22. In a breech-loading gun, the combination with a breech-block adapted to rotate through an angle to unlock and then to be moved longitudinally in reverse directions and provided with a vertical face near its head with cam-grooves cut in said face, of an extractor-holder detachably connected to said breech-block and moving longitudinally therewith, means secured to or integral with the gun-body for holding the extractor-holder from turning with said breech-block, with oppositely-disposed recesses in said extractor-holder, and extractors mounted to rock and to slide in said recesses, and provided with lever-arms engaging in said cam-grooves, with springs also mounted in said recesses engaging the backs of said extractors and pressing said extractors toward the axis of the breech-block, substantially as described.

23. In a breech-loading gun, the combination with a breech-block adapted to rotate through an angle to unlock and then to be moved longitudinally in reverse directions and provided with a vertical face near its head with cam-grooves cut in said face, of an extractor-holder detachably connected to said breech-block and moving longitudinally therewith, means secured to or integral with the gun-body for holding the extractor-holder from turning with said breech-block and oppositely-disposed recesses in said extractor-holder, and extractors mounted to rock and to slide in said recesses and provided with lever-arms engaging in said cam-grooves, with springs also mounted in said recesses and secured to the backs of the extractors and to the extractor-holder, respectively, and pressing said extractors inward toward the axis of the breech-block, substantially as described.

24. In a breech-loading gun, the combination with a breech-block adapted to rotate for locking and unlocking and to move longitudinally in reverse directions, and provided with a vertical face near its head with cam-grooves cut in said face, of an extractor-holder mounted on said breech-block and moving longitudinally therewith, means secured to or integral with the gun-body for holding the extractor-holder from turning therewith, and provided with oppositely-disposed recesses and inclined grooves, and with shoulders in the rear of said inclined grooves, extractors mounted in said recesses and having shanks sliding in said inclined grooves with lugs engaging said shoulders, and lever-arms engaging in said cam-grooves, substantially as described.

25. In a breech-loading gun, the combination with a breech-block adapted to rotate for locking and unlocking and to move longitudinally in reverse directions and provided with a vertical face near its head with cam-grooves cut in said face, of an extractor-holder mounted on said breech-block and moving longitudinally therewith, means secured to or integral with the gun-body for holding the extractor-holder from turning therewith and provided with oppositely-disposed recesses and inclined grooves, and shoulders in the rear of said inclined grooves, extractors mounted in said recesses and having shanks sliding in said inclined grooves with lugs engaging said shoulders, and lever-arms engaging in said cam-grooves, with springs interposed between the backs of said extractors, and said extractor-holder and pressing said extractors inward toward the axis of the breech-block, substantially as described.

26. In a breech-loading gun, the combination with a breech-block adapted to rotate for locking and unlocking and to move longitudinally in reverse directions and provided with a vertical face near its head with cam-grooves cut in said face, of an extractor-holder mounted on said breech-block and moving longitudinally therewith, means secured to or integral with the gun-body for holding the extractor-holder from turning therewith and provided with oppositely-disposed recesses and inclined grooves, and shoulders in rear of said inclined grooves, and extractors mounted in said recesses and having shanks sliding in said inclined grooves with lugs engaging said shoulders, and lever-arms engaging in said cam-grooves, with springs connected to the backs of the extractors and also to the extractor-holder and tending to retain said extractors in said holder and also to press said extractors toward the axis of the breech-block, substantially as described.

27. In a breech-loading gun, the combination with a breech-block provided with tenons and adapted to rotate through an angle to unlock and then to be moved longitudinally in reverse directions, with cam-grooves in the front face of said tenons, of an extractor-holder recessed to register with said tenons and mounted on said breech-block and moving longitudinally therewith, means secured to or integral with the gun-body for holding the extractor-holder from turning with said breech-block, and oppositely-disposed extractors mounted to rock and to slide in said extractor-holder in front of said tenons and provided with lever-arms engaging in said cam-grooves, substantially as described.

28. In a breech-loading gun, the combination with a breech-block provided with tenons and adapted to rotate through an angle to unlock and then to be moved longitudinally in reverse directions, with cam-grooves in the front face of said tenons, of an extractor-holder recessed to register with said tenons and mounted on said breech-block and moving longitudinally therewith, means secured to or integral with the gun-body for holding the extractor-holder from turning with said block, oppositely-disposed extractors mounted to rock and to slide in said extractor-holder in front of said tenons and provided with lever-arms engaging said cam-grooves, and springs engaging the backs of said extractors and pressing said extractors toward the axis of the breech-block, substantially as described.

29. In a breech-loading gun, the combination with a breech-block provided with tenons and adapted to rotate through an angle to unlock and then to be moved longitudinally in reverse directions, with cam-grooves in the front face of said tenons, of an extractor-holder having recesses to register with said tenons and mounted on said breech-block and moving longitudinally therewith, means secured to or integral with the gun-body for holding the extractor-holder from turning with said block, oppositely-disposed extractors mounted to rock and to slide in said extractor-holder in front of said tenons and provided with lever-arms engaging said cam-grooves, and springs secured in the backs of the extractors and to the extractor-holder respectively, and pressing said extractors inward toward the axis of the breech-block, substantially as described.

30. In a breech-loading gun, the combination with a breech-block provided with tenons and adapted to rotate for locking and unlocking and to move longitudinally in reverse directions, with cam-grooves in the front face of said tenons, of an extractor-holder recessed to register with said tenons and mounted on said breech-block and moving longitudinally therewith, means secured to or integral with the gun-body for holding the extractor-holder from turning therewith and provided with oppositely-disposed recesses and inclined grooves, in front of said tenons, of extractors mounted in said recesses, and having shanks engaging in said inclined grooves, and also having lever-arms engaging in said cam-grooves, substantially as described.

31. In a breech-loading gun, the combination with a breech-block provided with tenons and adapted to rotate for locking and unlocking and to move longitudinally in reverse directions, with cam-grooves in the front face of said tenons, of an extractor-holder recessed to register with said tenons and mounted on said breech-block and moving longitudinally therewith, means secured to or integral with the gun-body for holding the extractor-holder from turning therewith, and provided with oppositely-disposed recesses and inclined grooves in front of said tenons, of extractors mounted in said recesses and having shanks engaging in said inclined grooves, and also having lever-arms engaging in said cam-grooves, with springs interposed between the backs of said extractors and said extractor-holder and pressing said extractors inward toward the axis of the breech-block, substantially as described.

32. In a breech-loading gun, the combination with a breech-block provided with tenons and adapted to rotate for locking and unlocking and to move longitudinally in reverse directions, with cam-grooves in the front face of said tenons, of an extractor-holder mounted on said breech-block, recessed to register with said tenons and moving longitudinally therewith, the said extractor-holder being provided with oppositely-disposed recesses and inclined grooves, in front of said tenons, and extractors mounted in said recesses and having shanks engaging in said inclined grooves and also having lever-arms engaging in said cam-grooves, with springs connected to the backs of the extractors and also to the extractor-holder and tending to retain said extractors in said holder and also to press said extractors toward the axis of the breech-block, and means secured to or integral with the gun-body for holding the extractor-holder from turning relative to the breech-block, substantially as described.

33. In a breech-loading gun, the combination with a breech-block adapted to rotate for locking and unlocking and to move longitudinally in reverse directions and provided with a vertical face near its head with cam-grooves therein, of an extractor-holder mounted on said breech-block and moving longitudinally therewith, means secured to or integral with the gun-body for holding the extractor-holder from turning therewith, and provided with oppositely-disposed recesses and inclined radial grooves and shoulders in the rear of said inclined grooves, and extractors mounted in said recesses and having claws with inclined front faces adapted to strike the rim of the cartridge-case, and shanks sliding in said inclined grooves with lugs engaging said shoulders, and with lever-arms engaging in said cam-grooves, substantially as described.

34. In a breech-loading gun, the combination with a breech-block adapted to rotate for locking and unlocking and to move longitudinally in reverse directions and provided with a vertical face near its head with cam-grooves therein, of an extractor-holder mounted on said breech-block and moving longitudinally therewith, means secured to or integral with the gun-body for holding the extractor-holder from turning therewith and provided with oppositely-disposed recesses and inclined grooves and shoulders in the rear of said inclined grooves, extractors mounted in said recesses and having claws with inclined front faces adapted to strike the rim of the cartridge-case, and shanks sliding in said inclined grooves with lugs engaging said shoulders, and with lever-arms engaging in said cam-grooves, and springs interposed between the backs of said extractors and said extractor-holder and pressing said extractors inward toward the axis of the breech-block, substantially as described.

35. In a breech-loading gun, the combination with a longitudinally-movable breech-block, of an extractor-holder detachably mounted on said breech-block and moving longitudinally therewith and provided with oppositely-disposed recesses and inclined grooves, of extractors mounted in said recesses and having shanks engaging in said inclined grooves, with springs interposed between the backs of said extractors and said extractor-holder and pressing said extractors inward toward the axis of the breech-block, substantially as described.

36. In a breech-loading gun, the combination with a longitudinally-movable breech-block, of an extractor-holder, comprising a ring with two blocks carried thereby, detachably connected to said breech-block and moving longitudinally therewith, with oppositely-disposed recesses in said extractor-holder, and extractors mounted in said recesses, substantially as described.

37. In a breech-loading gun, the combination with a longitudinally-movable breech-block, of an extractor-holder comprising a ring with two blocks carried thereby, detachably connected to said breech-block and moving longitudinally therewith, with oppositely-disposed recesses in said extractor-holder, and extractors mounted in said recesses, with springs also mounted in said recesses engaging the backs of said extractors and pressing said extractors toward the axis of the breech-block, substantially as described.

38. In a breech-loading gun, the combination with a longitudinally-movable breech-block, of an extractor-holder comprising a ring with two blocks carried thereby detachably connected to said breech-block and moving longitudinally therewith, with oppositely-disposed recesses in said extractor-holder, and extractors mounted in said recesses, with springs also mounted in said recesses and secured to the backs of the extractors and to the extractor-holder, respectively, and pressing said extractors inward toward the axis of the breech-block, substantially as described.

39. In a breech-loading gun, the combination with a longitudinally-movable breech-block, of an extractor-holder comprising a ring with two blocks carried thereby mounted on said breech-block and moving longitudinally therewith and provided with oppositely-disposed recesses and inclined grooves, and shoulders in rear of said inclined grooves, and extractors mounted in said recesses and having shanks sliding in said inclined grooves with lugs engaging said shoulders, substantially as described.

40. In a breech-loading gun, the combination with a longitudinally-movable breech-block, of an extractor-holder comprising a ring with two blocks carried thereby mounted on said breech-block and moving longitudinally therewith and provided with oppositely-disposed recesses and inclined grooves, and shoulders in rear of said inclined grooves, and extractors mounted in said recesses and having shanks sliding in said inclined grooves with lugs engaging said shoulders, with springs interposed between the backs of said extractors, and said extractor-holder and pressing said extractors inward toward the axis of the breech-block, substantially as described.

41. In a breech-loading gun, the combination with a longitudinally-movable breech-block, of an extractor-holder comprising a ring with two blocks carried thereby mounted on said breech-block and moving longitudinally therewith and provided with oppositely-disposed recesses and inclined grooves, and shoulders in rear of said inclined grooves, and extractors mounted in said recesses and having shanks sliding in said inclined grooves with lugs engaging said shoulders, with springs connected to the backs of the extractors and also to the extractor-holder and tending to retain said extractors in said holder and also to press said extractors toward the axis of the breech-block, substantially as described.

In testimony whereof we affix our signatures in presence of two witnesses.

LAURENCE V. BENÉT.
HENRI A. MERCIÉ.

Witnesses:
CHARLES KURER,
ALFRED CLERICEAN.